March 8, 1966  G. B. STILLWAGON, JR  3,239,233
TOOL BIT AND HOLDER ASSEMBLY
Filed Aug. 17, 1964
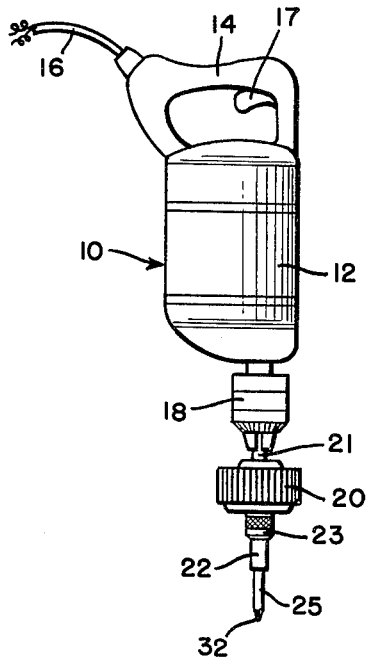
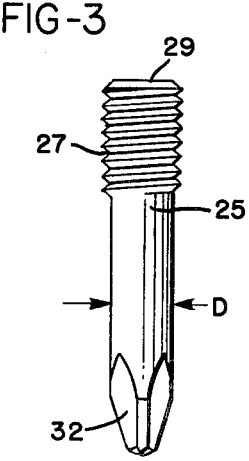
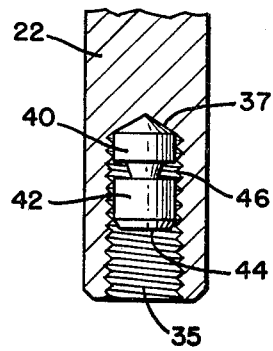
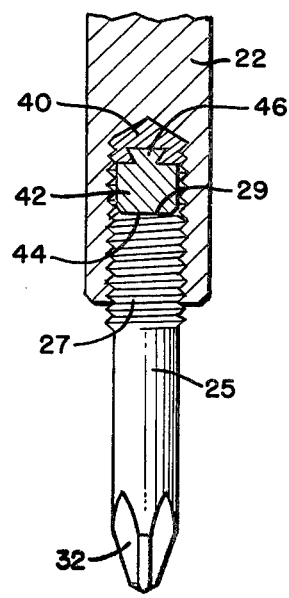
INVENTOR.
GEORGE B. STILLWAGON, Jr.
BY
Marechal, Biebel, French & Bugg
ATTORNEYS

United States Patent Office 3,239,233
Patented Mar. 8, 1966

3,239,233
TOOL BIT AND HOLDER ASSEMBLY
George B. Stillwagon, Jr., Dayton, Ohio, assignor to Gardner-Denver Company, Dayton, Ohio, a corporation of Delaware
Filed Aug. 17, 1964, Ser. No. 389,871
6 Claims. (Cl. 279—99)

This invention relates to a tool bit and holder assembly, and more particularly, to an assembly which provides for an economical construction while assuring accurate alignment between the bit and the holder.

It is frequently desirable to mount a driver bit in such a manner that the bit may be easily removed from the holder for interchanging with another bit, or for some operation to be performed with the tool bit, as for example, a sharpening or reforming operation. In addition to this desirable feature, it is necessary that the tool bit be retained so that each tool bit is aligned accurately with the bit holder to prevent the end of the tool bit from allowing an eccentric path about the axis of rotation. Any misalignment of the tool bit makes it difficult to use the power tool in an efficient manner, especially for high-speed production.

Commonly, accurate alignment is provided by forming a square shoulder on the tool bit which butts against a cooperating shoulder or square end on the holder. From a manufacturing standpoint, however, this construction has been found to be somewhat expensive since larger bit stock is required in order to have sufficient stock to form a substantially square shoulder on the bit.

Accordingly, it is a primary object of the present invention to provide a novel low cost tool bit and holder assembly which is adapted to be rotated in one direction by a power tool and which assembly is simple in construction and economical to manufacture.

In another object, the present invention provides a rotary tool bit and holder assembly, as outlined above, which includes an inexpensive means for maintaining axial accurate alignment between the tool bit and the holder.

It is also an object of the invention to provide a tool bit and holder assembly, as outlined above, wherein the tool bit may be easily and quickly removed from the holder.

Still another object of the invention is to provide a tool bit and holder assembly, as outlined above, wherein the bit has a threaded end portion or shank and a square end surface and which is free of any shoulder or other structure where stress concentration may occur.

A further object of this invention is the provision of a tool holder for a threaded bit which has a threaded opening formed therein and which has a slug or a plug member received in the bottom of the opening defining a seat against which the bit bottoms when threaded into the holder, so that the bit is held in accurately aligned relation with the holder.

Another object of this invention is the provision of a bit and holder assembly wherein the bit holder has a threaded opening extending partially therethrough with a soft metal slug, such as an aluminum slug, received in the bottom of the threads and a hard metal plug driven into the soft slug for retaining the plug in the threaded opening defining a firm seat against which a threaded bit can be screwed eliminating the need for shoulders or other aligning devices, in a low-cost tool.

Other objects and advantages of the invention will be apparent from the following description, the accompanying drawing and the appended claims.

In the drawing:

FIG. 1 is a view of a typical portable power tool which is adapted to use the tool bit and holder assembly constructed in accordance with the invention;

FIG. 2 is an axial section view, partially broken away, of the holder for the tool bit prior to expanding the internal bottom plug, according to the invention;

FIG. 3 is a view of a typical tool bit having a square end and a threaded end portion formed in accordance with the invention; and FIG. 4 is an axial section view, in part, of an assembled tool bit and holder assembly in accordance with the invention.

Referring to the drawing, which illustrates a preferred embodiment of the invention, the portable power tool, generally referred to as 10 in FIG. 1, is shown as representative of a typical power tool which may be employed to drive the tool bit and holder assembly which is constructed in accordance with the invention. However, while the tool bit and holder assembly of the invention is suited ideally to be driven by a power tool, it is to be understood that the assembly may be used on hand tools, as for example, a hand screw driver or drive wrench.

As illustrated in FIG. 1, the portable power tool 10 may take the form of a portable electric drill which includes a motor housing 12, a handle 14, an electrical supply cord 16, a start trigger 17 and a chuck 18. In order to convert the relatively high r.p.m. output of the electric drill to a usable slower speed, a suitable speed reducing unit 20 is provided which has a shank 21 mounted within the chuck 18.

Rigidly mounted within the opposite end of the speed reducing unit 20 is a tool bit holder 22. While the external configuration may take any number of forms, it is preferred that the holder body be constructed from solid bar stock and include a shank portion (not shown) which is adapted for being secured by suitable engagement means within the chuck 23 of the speed reducing unit 20 so that accurate alignment is maintained between the tool bit holder 22 and the axis of rotation of the drill chuck 18.

Inserted within the holder 22 is a straight cylindrical tool bit 25 having a threaded shank 27 and a square flat end surface 29, FIG. 3. For purposes of illustration, the tool bit 25 is shown with a conventional Phillips drive head 32 for cruciform slotted fasteners. It is to be understood, however, that the drive head may be constructed in any desired shape or form. As shown in FIG. 3, the tool bit 25 preferably is constructed from bar stock of alloy tool steel having a diameter D and the threaded portion 27 is formed by a rolling operation which can be performed in an economical manner. The square end 29 is preferably formed prior to the rolling of the threads 27.

In order to receive the tool bit 25, the holder 22 includes a threaded opening or hole 35 which extends axially partially into the holder 22 and permits the tool bit 25 to be easily assembled and removed. It can be seen, however, that due to the threaded connection between the tool bit 25 and the holder 22, the assembly is suitable only for driving the tool bit 25 in one direction. This is not a disadvantage, however, in view of the fact that normally, in high production applications, the tool bit will be employed full time for driving and tightening screws, or the like.

In the usual manner of construction, the tapped hole 35 will have an inner conical shaped bottom 37 which results from the drilling of the hole. Inserted at the bottom of the tapped hole 35 is a round deformable plug 40 which preferably has an end contour conforming to the conical shaped bottom 37 of the tapped hole 35. According to the invention, the plug 40 is formed from a material which can be expanded or deformed into the bottom threads of the tapped hole 35. One preferred material is aluminum of a relatively soft alloy. Of course, other deformable materials may perform adequately, such as lead, tin or some epoxy cements.

Spaced on top of the plug 40 within the threaded hole 35 is a substantially harder cylindrical plug 42 which has a diameter substantially the same as the internal diameter of the threaded hole 35 to form a close fit. By providing the plug 42 with a flat, square outer or exposed end surface 44, it can be seen that due to the close fit between the plug 42 and the threaded hole 35, the surface 44 will be seated squarely within the hole 35 on a normal or radial plane in relation to the axis of rotation.

Formed as an integral part of the plug 42, on the end opposite from the square surface 44, is an inverted frustum shaped projection 46 which is adapted to be driven or pressed down into the softer plug 40 causing the latter plug to deform or expand into the bottom threads of the tapped hole 35 and flow in and around the projection 46 to lock in or retain the plug 42, as shown in FIG. 4. Thus, by applying a suitable driving force against the surface 44 of the plug 42, the plug 37 is changed from the configuration shown in FIG. 2 to the configuration shown in FIG. 4.

Thus, when the outer plug 42 is driven into the softer inner plug 40, these separate parts become essentially one and may be considered as a plug or slug having deformable means on an inner end thereof seated into the threads of the holder, with means on the other end thereof defining a relatively hard or firm bit engaging portion. This portion thus presents a surface 44 which forms a bottom or a seat in the bit opening which is adapted to be engaged by the end 29 of the bit 25.

By this arrangement, it can be seen that the holder is provided with a bottom surface 44 defining a plane normal to the axis of the holder which is adapted to engage and provide a stop for the flat square surface 29 on the end of the tool bit 25.

In the absence of the plugs and stop defined thereby, the bit would seat on imperfect threads alone and would be canted from the holder axis. Also, it would tend to tighten with use and become difficult to remove. With the present invention, an accurate alignment can be maintained between the holder 22 and the tool bit 25.

The plug 42 provides a means by which the holder 22 can be provided with a tapped opening of an accurately controlled depth, as by the surface 44. Furthermore, it is not essential that the surface 44 be planar, but only that it defines an accurate seat for the bit 25. Thus, the surface 44 may, in some instances, form a point or a line contact with the center of the cooperating bottom 29 of the bit 25. The primary pre-requisite is the provision of an accurately positioned stop means within the threaded opening of the holder to define the seated position of the bit 25 and thereby provide an accurate alignment between the holder and the bit.

It will therefore be seen that this invention eliminates the need for a collar or other shoulder which is commonly formed on threaded bits and accordingly, eliminates the stress concentration between the shoulder and the threaded portion of such bits. By eliminating the shoulder and associated stress concentration, the present invention eliminates the main source of structural failure which commonly results with shoulder tool bits.

Also of importance are the economies which result by the tool and bit holder of this invention. The bits and holders which are made accordingly to this invention permit accurate alignment in each instance using only manufacturing and assembling procedures which are economical and permitting the maximum utilization of the tool steel of the bit.

While the form of apparatus herein described constitute a preferred embodiment of the invention, it is to be understood that the invention is not limited to this precise form of apparatus, and the changes may be made therein without departing from the scope of the invention which is defined in the appended claims.

What is claimed is:

1. A tool bit and holder assembly adapted for economical construction and for providing accurate alignment, said assembly comprising, a holder having a threaded hole formed partially thereinto, a first plug of substantial hardness inserted within said hole, a second plug of deformable material spaced between said first plug and the bottom of said hole and adapted to engage the bottom threads when deformed within said hole, means connecting said first plug with said second plug to retain said first plug, a bit having a threaded shank being inserted within said hole and engaging said first plug to provide for accurate alignment between said bit and said holder.

2. A tool bit and holder assembly adapted for economical construction and for providing accurate alignment, said assembly comprising, a holder having a threaded hole formed partially therein, a first plug of substantial hardness inserted within said hole and adapted to provide a square flat surface within said hole, a second plug of deformable material softer than said first plug and spaced between said first plug and the bottom of said hole, means projecting from said first plug and extending into said second plug for deforming said second plug and to retain said first plug, a bit having a threaded shank and a square end being inserted within said hole to engage said square flat surface provided by said first plug to provide for accurate alignment between said bit and said holder.

3. A tool bit and holder assembly adapted for economical construction and for providing accurate alignment, said assembly comprising, an elongated holder having a threaded hole formed partially thereinto along the axis, a round first plug of substantial hardness inserted within said hole with a close fit and adapted to provide a square flat surface within said hole, a second plug of substantially softer deformable material spaced between said first plug and the bottom of said hole and adapted to engage when deformed the bottom threads within said hole, an inverted frustum shaped projection extending from said first plug into said second plug to retain said first plug and to deform said second plug, a bit having a threaded shank and a square flat end being inserted within said hole to engage said square flat surface of said first plug for providing accurate alignment between said bit and said holder.

4. A low cost tool bit and holder assembly comprising a bit having a straight generally cylindrical shank threaded at one end thereof, a holder for said bit having a generally elongated body and having means formed on one end thereof for engagement by a tool driving device, and further having a threaded opening formed in the other end thereof extending generally axially partially into said bit holder, bit alignment means in said holder including a hard generally cylindrical plug having a diameter proportioned to form a relatively close fit in said opening and seated in said opening near the bottom thereof, deformable means between said plug and said bottom to retain said plug in said seated position when said plug is pressed into said opening with force against said deformable means, and means of said plug defining a bit-engaging surface against which said bit engages when threaded into said holder for supporting said bit axially of said threaded opening.

5. A tool bit holder for supporting a threaded shank tool bit in accurate axially aligned relation with said holder comprising a generally cylindrically body, means in said body defining a threaded opening extending axially partially therein and opening at one end thereof for receiving said threaded tool bit, a generally cylindrical slug received in said opening having a hard portion presenting a surface forming a bottom to said opening proportioned to engage an end of said tool bit when said tool bit is threaded therein preventing said tool bit from bottoming on threads alone, and further having an inner relatively soft portion deformed into the threads of said opening at the inner end thereof retaining said slug in said inserted position.

6. A tool holder for a threaded shank tool bit for supporting said bit in accurately aligned axial relation to said holder comprising a holder body, means in said body defining a threaded opening extending axially partially thereinto and opening at one end thereof to receive the threaded shank of said bit, a first generally cylindrical slug of relatively soft metal received in said opening at the bottom thereof and a second slug of relatively hard metal slidably received in said opening and having a diameter forming a relatively close fit therein, means on an inner end of said second slug defining a projection adapted to be press-fitted into said first slug deforming the material of said first slug thereabout and into the adjacent threads at the bottom of said opening locking said first and second slugs in a fitted position in said body, and means on the outer end of said second slug defining a surface lying in a plane normal to said holder axis and forming an accurately aligned stop against which said bit engages when threaded into said opening.

References Cited by the Examiner

UNITED STATES PATENTS

| | | | |
|---|---|---|---|
| 196,205 | 10/1877 | Elterich | 279—49 |
| 335,259 | 2/1886 | Warren | 168—29 |
| 822,983 | 6/1906 | Rhoda | 251—368 |

ROBERT C. RIORDON, *Primary Examiner.*

H. V. STAHLHUTH, *Assistant Examiner.*